United States Patent [19]

Dudley

[11] 4,185,306

[45] Jan. 22, 1980

[54] MAGNETIC TAPE PROCESSOR HAVING CLEANING AND EVALUATING MEANS

[76] Inventor: Don J. Dudley, 326 Woodland Dr., Brightwaters, N.Y. 11718

[21] Appl. No.: 892,734

[22] Filed: Apr. 3, 1978

[51] Int. Cl.$^2$ .................... G11B 15/06; G11B 23/04; G11B 23/50

[52] U.S. Cl. .................... 360/71; 360/74.6; 360/95; 360/128; 360/137; 15/306 R

[58] Field of Search .............. 360/71, 72–74, 360/84, 90, 128, 130, 137; 15/306 R, 306 A, 100; 134/9

[56] References Cited

U.S. PATENT DOCUMENTS

| | | | |
|---|---|---|---|
| 3,370,982 | 2/1968 | Hayunga | 360/137 |
| 3,718,777 | 2/1973 | Tupaj | 360/90 |
| 3,731,289 | 5/1973 | Bajgert et al. | 360/128 |
| 3,761,643 | 9/1973 | Keeler | 360/137 |
| 3,925,815 | 12/1975 | Althuber et al. | 360/74 |
| 3,949,425 | 4/1976 | Perret et al. | 360/137 |
| 4,004,314 | 1/1977 | Post et al. | 360/128 |
| 4,010,514 | 3/1977 | Fischer et al. | 360/137 |
| 4,011,587 | 3/1977 | Arter et al. | 360/72 |
| 4,054,927 | 10/1977 | Zimmerman | 360/72 |

OTHER PUBLICATIONS

IBM Tech. Disc. Bull., Hayunga, Blade Scraping Tape Cleaner, vol. 9, No. 6, Nov. 1966, p. 628.

Primary Examiner—Alfred H. Eddleman
Attorney, Agent, or Firm—Hane, Roberts, Spiecens & Cohen

[57] ABSTRACT

A portion of a magnetic tape mounted on a pair of reels in a videocasette having an access opening is withdrawn from the cassette by finger means and constrained to travel along a fixed path when the reels are driven. Opposite the fixed path is a tape wiper in the form of two pairs of spaced reels, each carrying a wiping tape with each wiping tape wiping one of the surfaces of the magnetic tape. In addition there is provided means for polishing the active surface of the magnetic tape as well as photoelectric means for evaluating such surfaces for imperfections.

19 Claims, 19 Drawing Figures

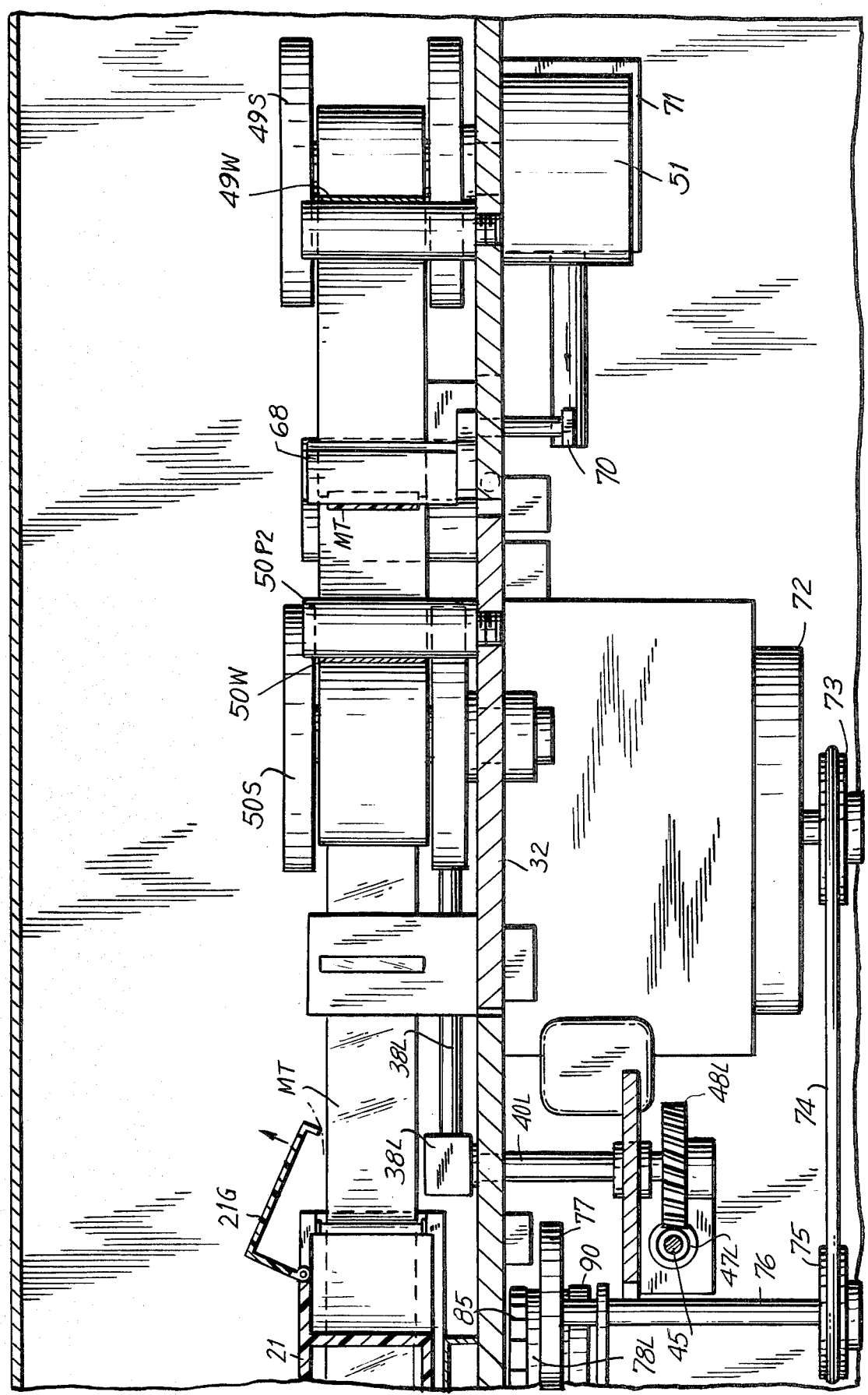

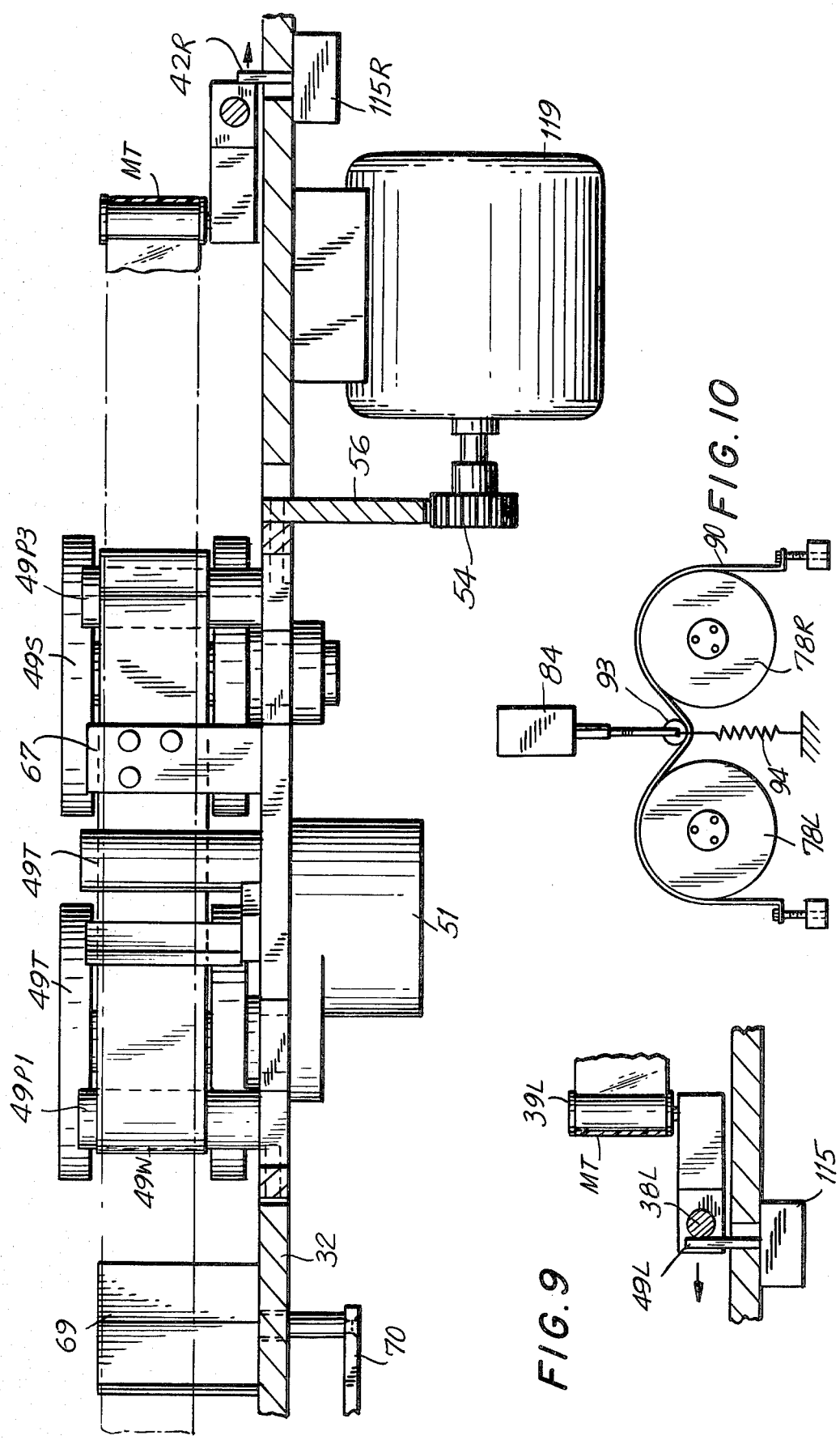

FIG. 13
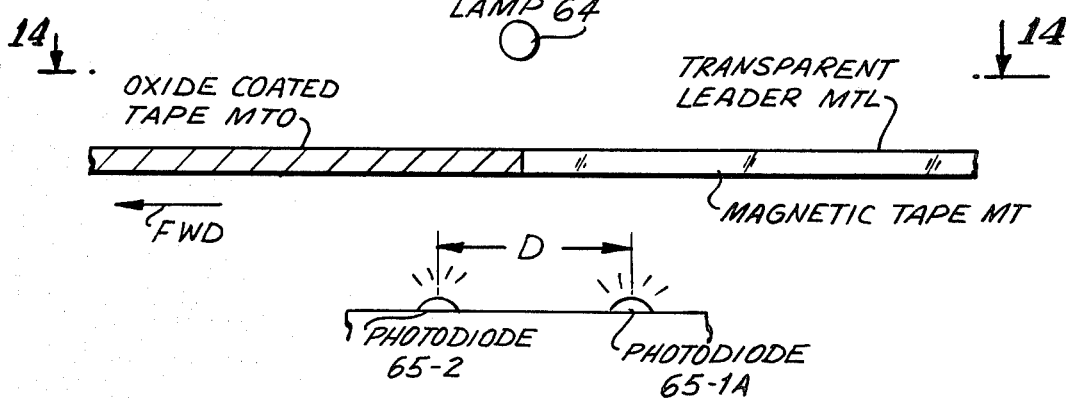
FIG. 14
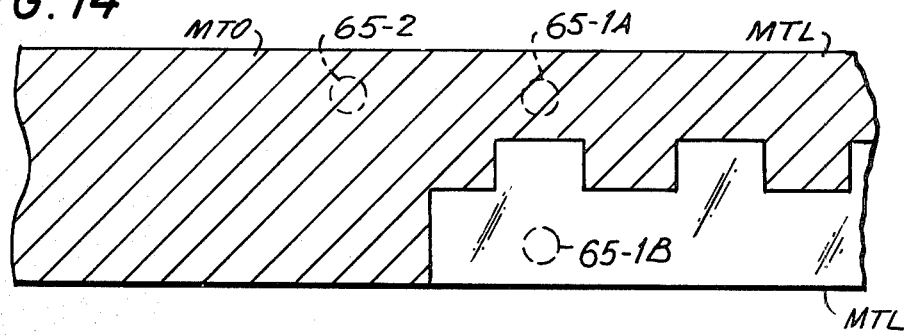
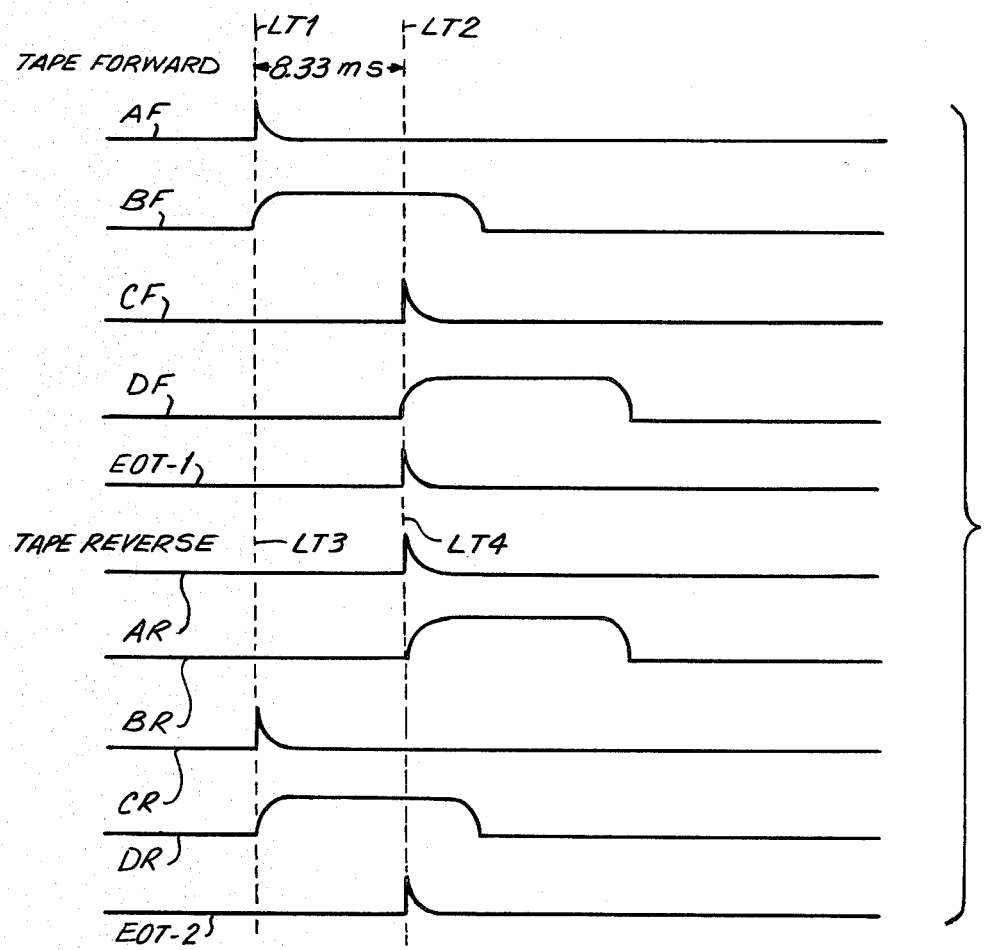
FIG. 16

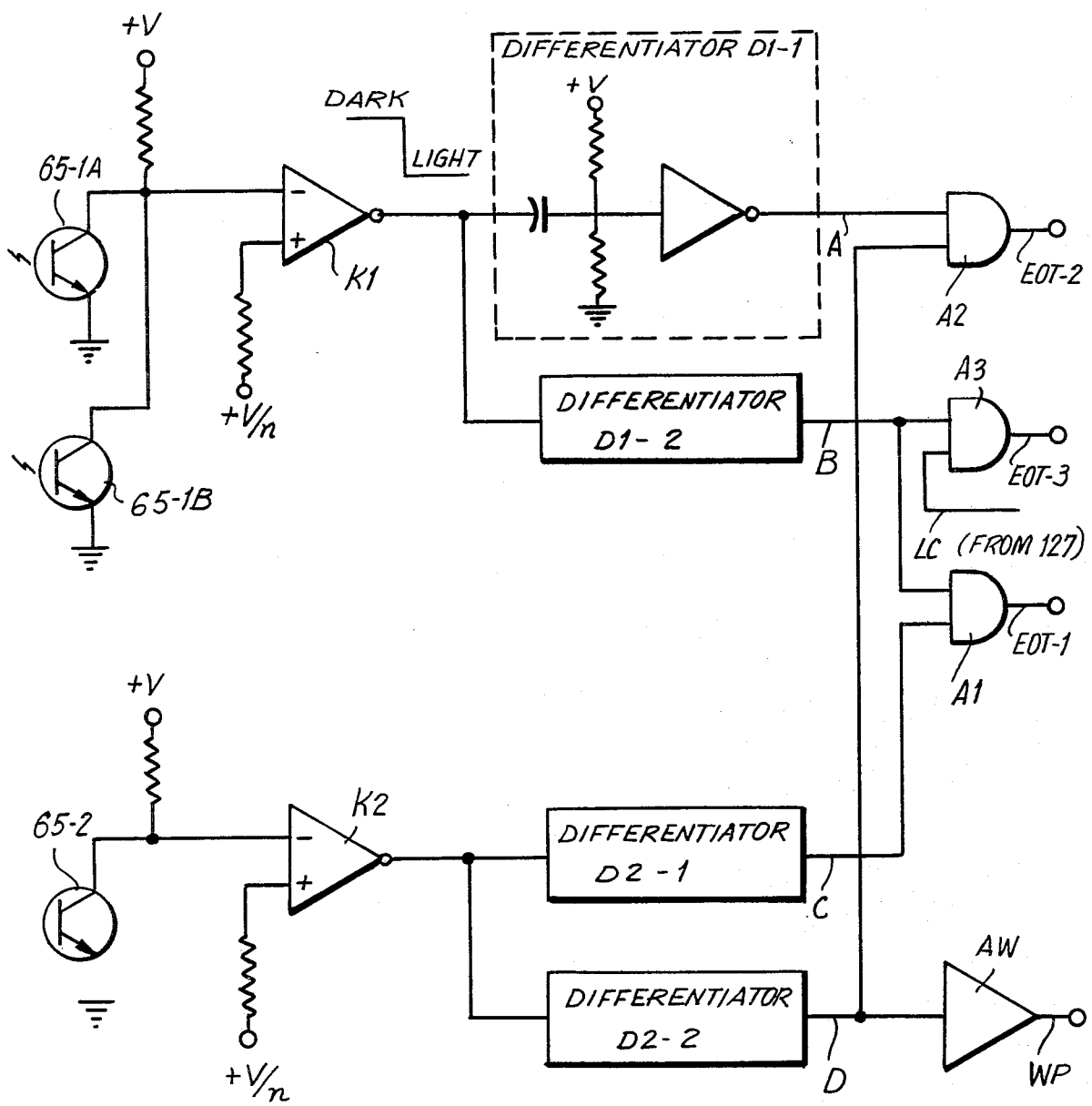

SLIT EVALUATION SYSTEM 60

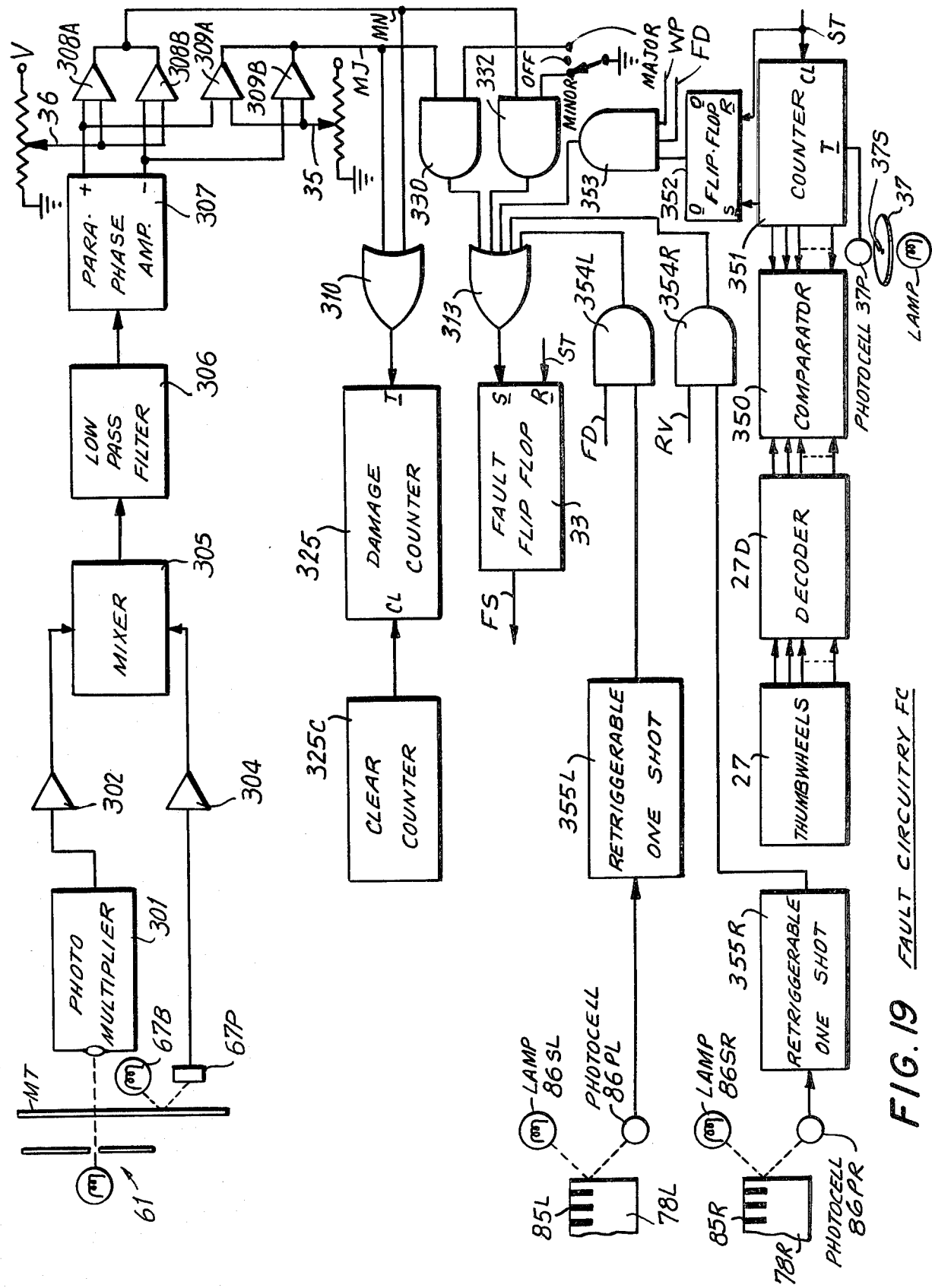
FIG. 19 FAULT CIRCUITRY FC

MAGNETIC TAPE PROCESSOR HAVING CLEANING AND EVALUATING MEANS

BACKGROUND OF THE INVENTION

This invention pertains to tape cleaners and more particularly to apparatus for wiping the surfaces of a magnetic tape mounted in a cassette.

Heretofore magnetic tapes in reel-to-reel configurations were moved from one reel to the other reel opposite a cleaning station, these stations could be brushes, wiping tissues or even liquid baths. However, with the use of video tape cassettes wherein the magnetic tape is within the cassette, the previously known techniques cannot be used because the tape must be unloaded from the cassette before any cleaning can be done. The work and complications involved have lead people to merely replace old cassettes instead of going to the greater expense of cleaning.

In U.S. Pat. No. 640,293, now abandoned, there is shown a film cleaning device which draws photographic film from a cartridge for cleaning. However, this device operates such that it cannot be used to process magnetic tape.

SUMMARY OF THE INVENTION

It is accordingly a general object of the invention to provide apparatus which simply and rapidly cleans, polishes and evaluates the magnetic tape mounted in a cassette.

Briefly, the invention contemplates apparatus for processing a magnetic tape having a layer of magnetizable material on one surface and being stored on two reels in a cassette. The apparatus has finger means which extend into the access opening of the cassette to engage the magnetic tape and withdraw it to a position for defining a path which is opposite a tape wiping means as well as a polishing means so that the reels of the tape are rotated the tape moves past the wiping means and is cleaned of dust and the like and past the polishing means so as to be polished at the same time.

BRIEF DESCRIPTION OF THE DRAWING

Other objects, the features and advantages of the invention will be apparent from the following detailed description when read with the accompanying drawing which shows by way of example and not limitation, the presently preferred embodiment of the invention.

In the drawing:

FIG. 7 is a sectional view taken along the line 7—7 of FIG. 5;

FIG. 8 is a sectional view taken along the line 8—8 of FIG. 5;

FIG. 9 is a sectional view taken along the line 9—9 of FIG. 5;

FIG. 10 is a top view of the hub and brake system;

FIG. 13 is a schematic top view of the magnetic tape and photoelectric portion of a leader sensing system;

FIG. 14 is a schematic view taken along line 14 of FIG. 13;

FIG. 15 is a circuit diagram of the leader sensing system;

FIG. 16 are waveforms useful in explaining the system of FIG. 15;

FIG. 19 is a logic diagram of the fault circuitry.

DESCRIPTION OF THE PREFERRED EMBODIMENT

Figure 1:
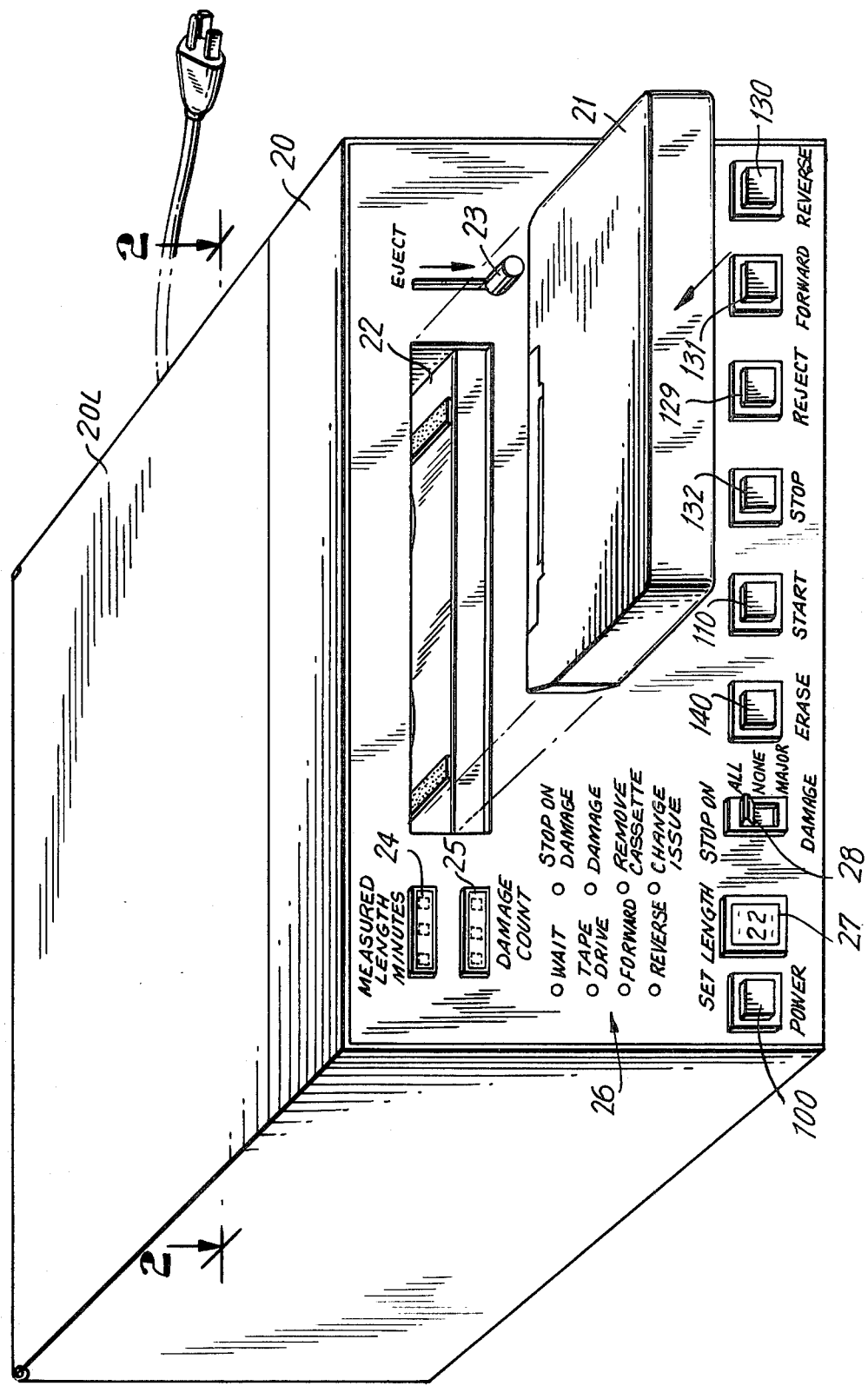
FIG. 1 is a perspective view of the presently preferred embodiment of the invention for cleaning, polishing and evaluating the magnetic tape in a videocassette.

In FIG. 1 there is shown a videocassette processor 20 whose front panel has a slot opposite a platform 22 upon which is placed a videocassette 21 for processing. The videocassette 21 is inserted and pushed rearward against a lockable spring means which when released will push the tape outward. Then, the load lever 23 is moved to the up position as shown in FIG. 1 for lowering the reels of videocassette 21 onto drive hubs hereinafter more fully described.

The front panel carries a number of indicator lamps. There are the digital indicators 24 and 25 which give tape length in minutes and damage counts respectively. In addition there are a plurality of on/off lamp indicators which give the status of the device as can be seen from the legending.

In addition, the front panel carries a plurality of switches such as the thumbwheel switches 27 to set the length of tape indications, the stop on damage switch 28, the power on/off switch 100, the start switch 110, and reject switch 129, the reverse switch 130, the forward switch 131 and the erase switch 140.

In operation, the line cord 141 is inserted into an appropriate recepticle, the power switch 100 is activated, the approximate length of the tape set on the thumbwheel switch 27, stop control switch 28 is set to the desired position and videocassette 21 is loaded onto the platform 22 followed by the raising of the load lever 23. Thereafter, the tape processing is performed as hereinafter described.

Figure 2:
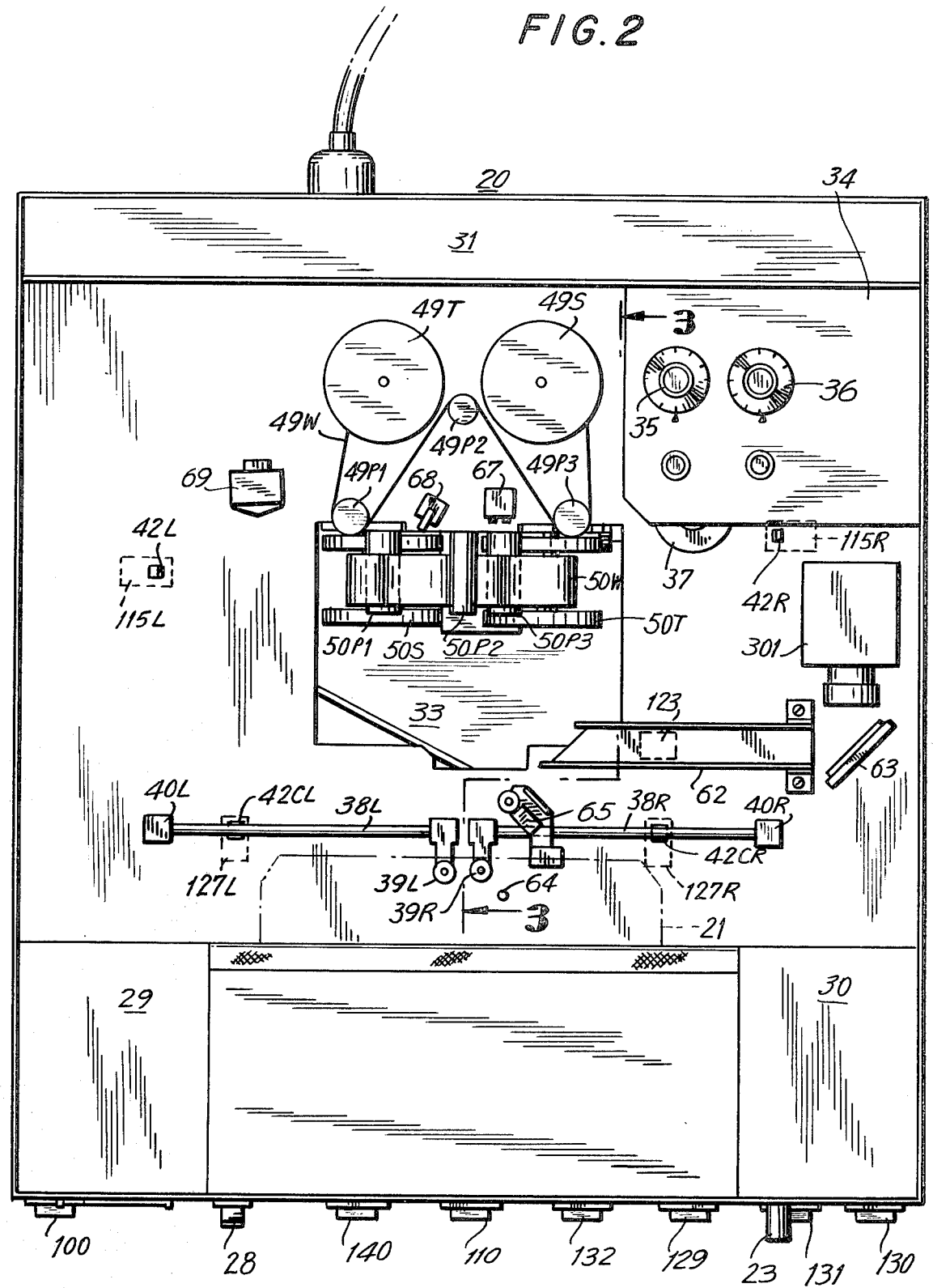
FIG. 2 is a top plan view of the device with the cover removed and a videocassette partially inserted.
Figure 4:
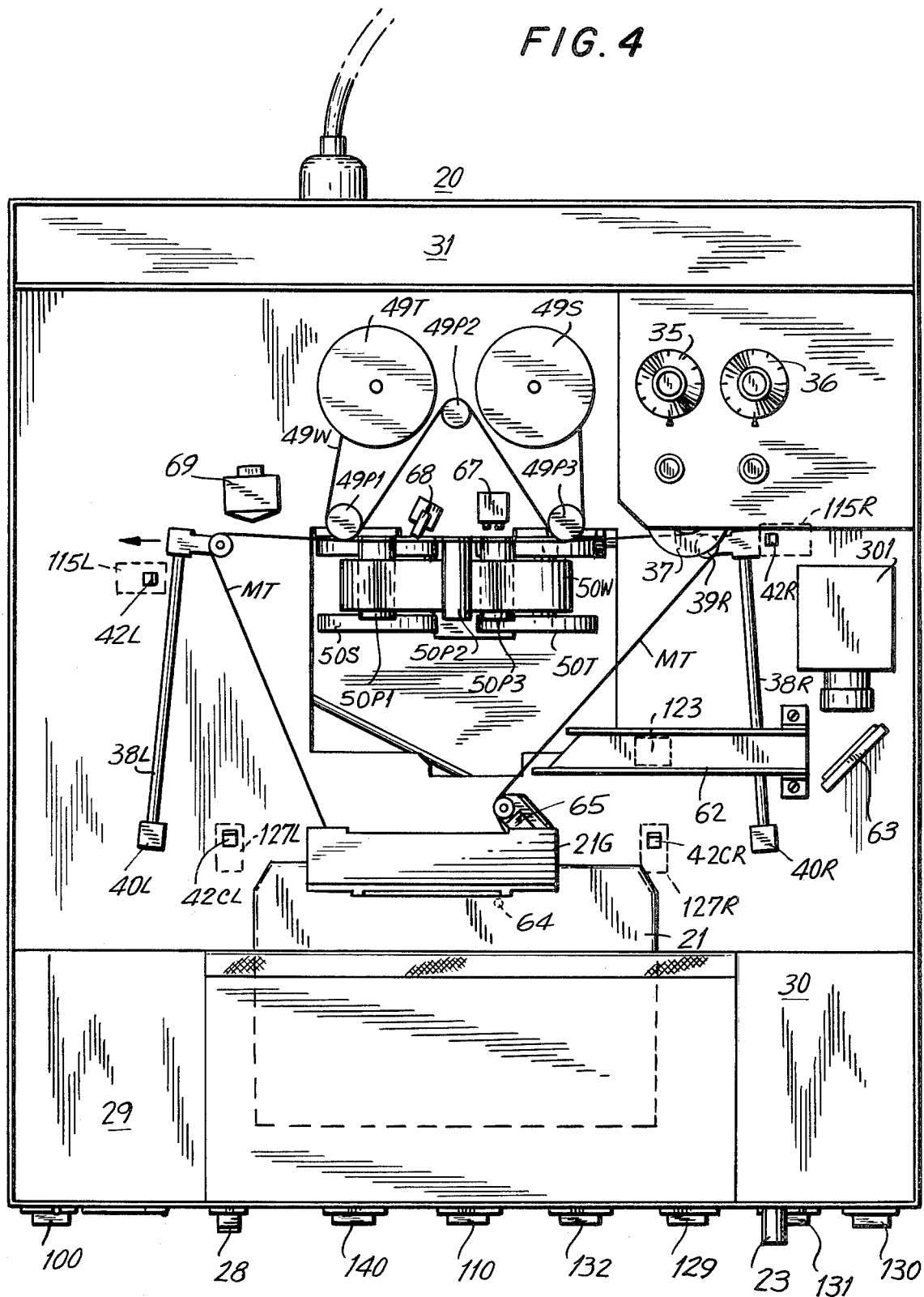
FIG. 4 is another top plan view with the videocassette fully inserted and the fingered loop-forming arms swung out.
Figure 5:
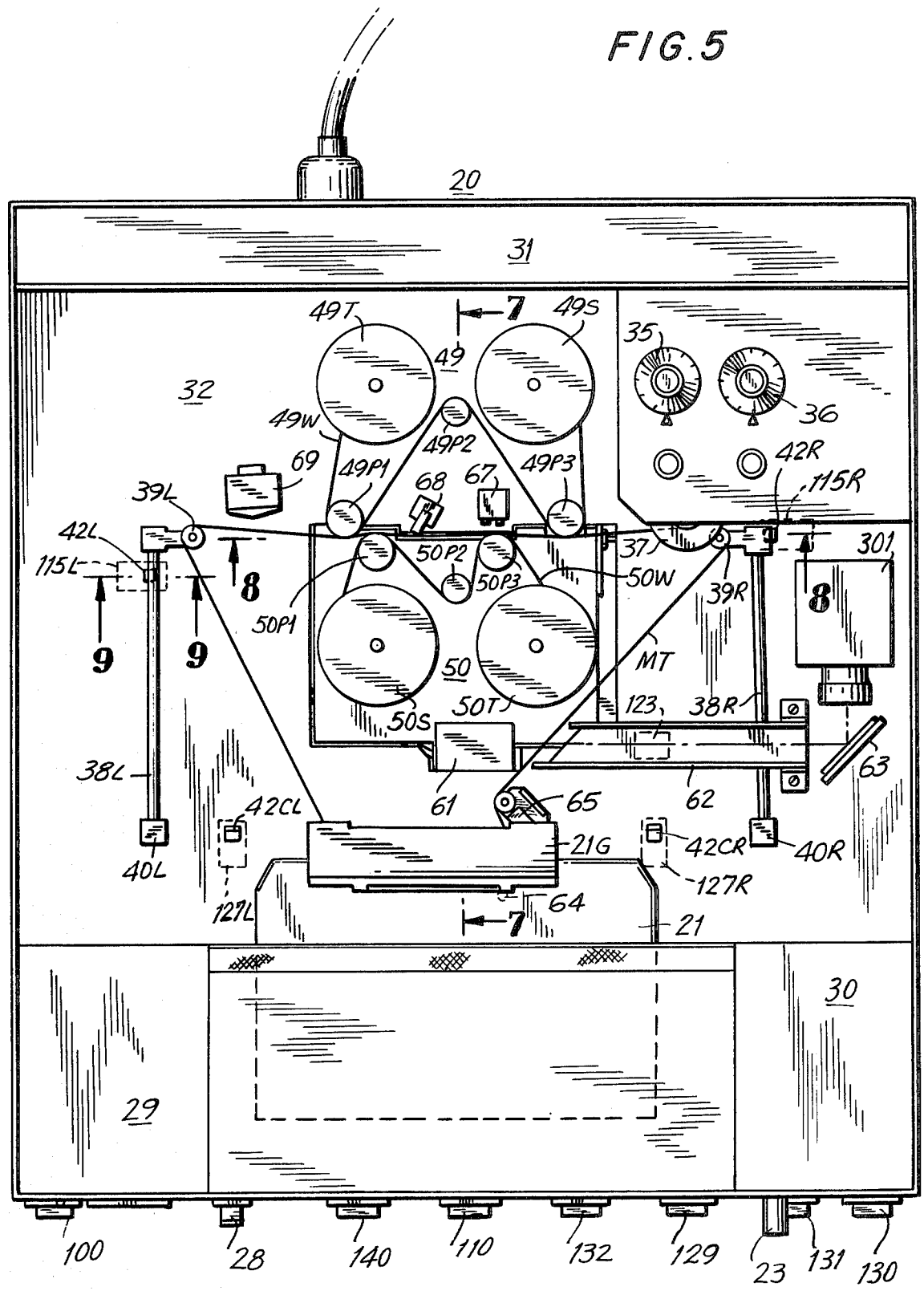
FIG. 5 is a further top plan view of the fully operational device, with the movable tissue station moved into the tape loop.

In FIGS. 2, 4 and 5 the top of the processor 20 is shown in various stages of operation. The control circuitry is housed in regions 29, 30 and 31. The detailed circuitry and the wiring among the various regions and switches is not shown for the sake of simplicity. Instead schematic diagrams are hereinafter disclosed. Most of the mechanical elements of the processor 20 are on chassis 32 provided with an opening 33. Disposed on chassis 32 is a subassembly 34 comprising major-and-minor damage sensitivity potentiometers 35 and 36 respectively. A tachometer array with a wheel 37 for converting magnetic tape travel to tape length in minutes is located below subassembly 34.

A pair of loop forming arms 38L and 38R with tape guide rollers or fingers 39L and 39R pivot about respective shafts 40L and 40R. The microswitches 115L and 115R with plungers 42L and 42R sense for the open positions of the arm 38. Similarly, microswitches 127L and 127R with plungers 42CL and 42CR sense for the closed position of the arms 38.

Figure 3:
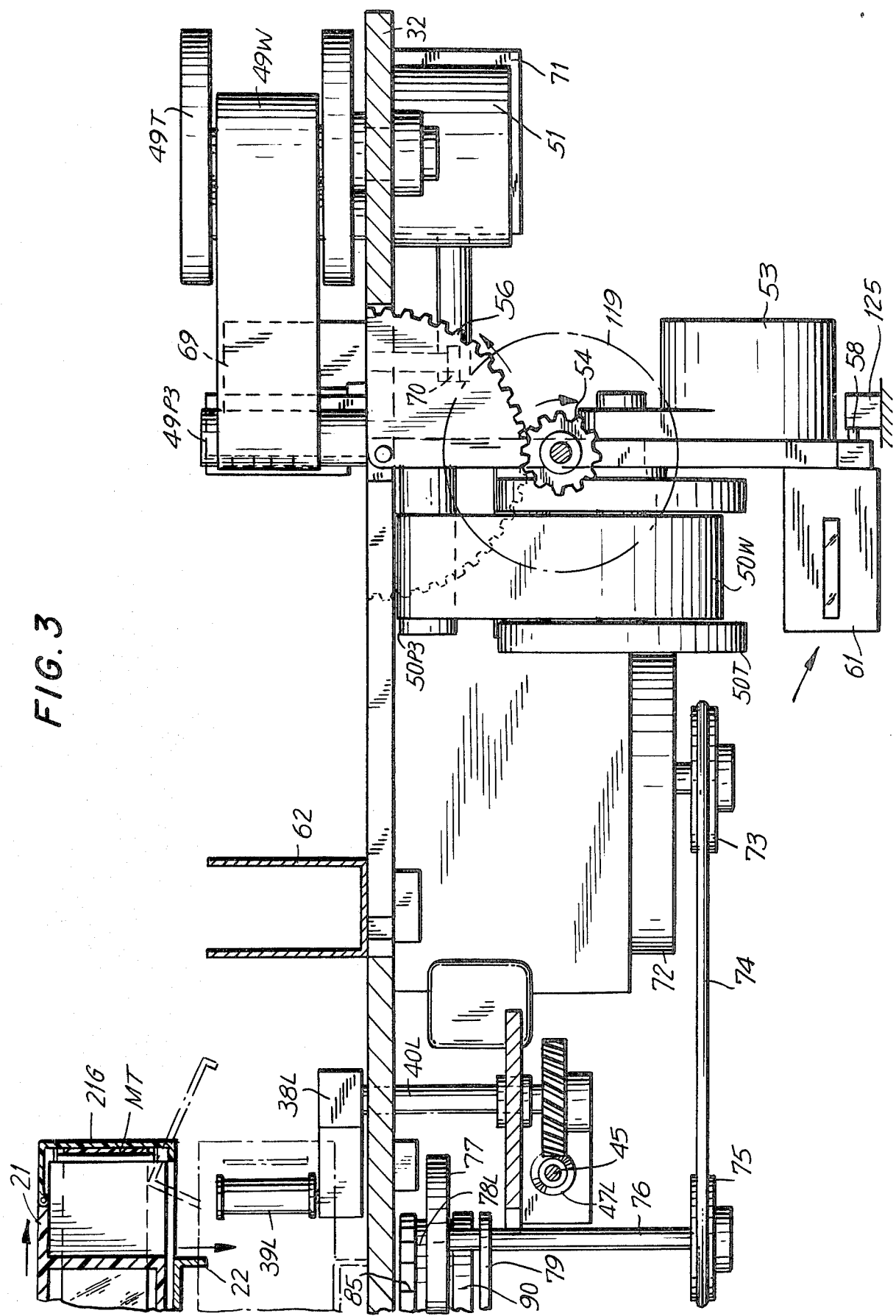
FIG. 3 is a sectional view taken along the line 3—3 of FIG. 2.
Figure 6:
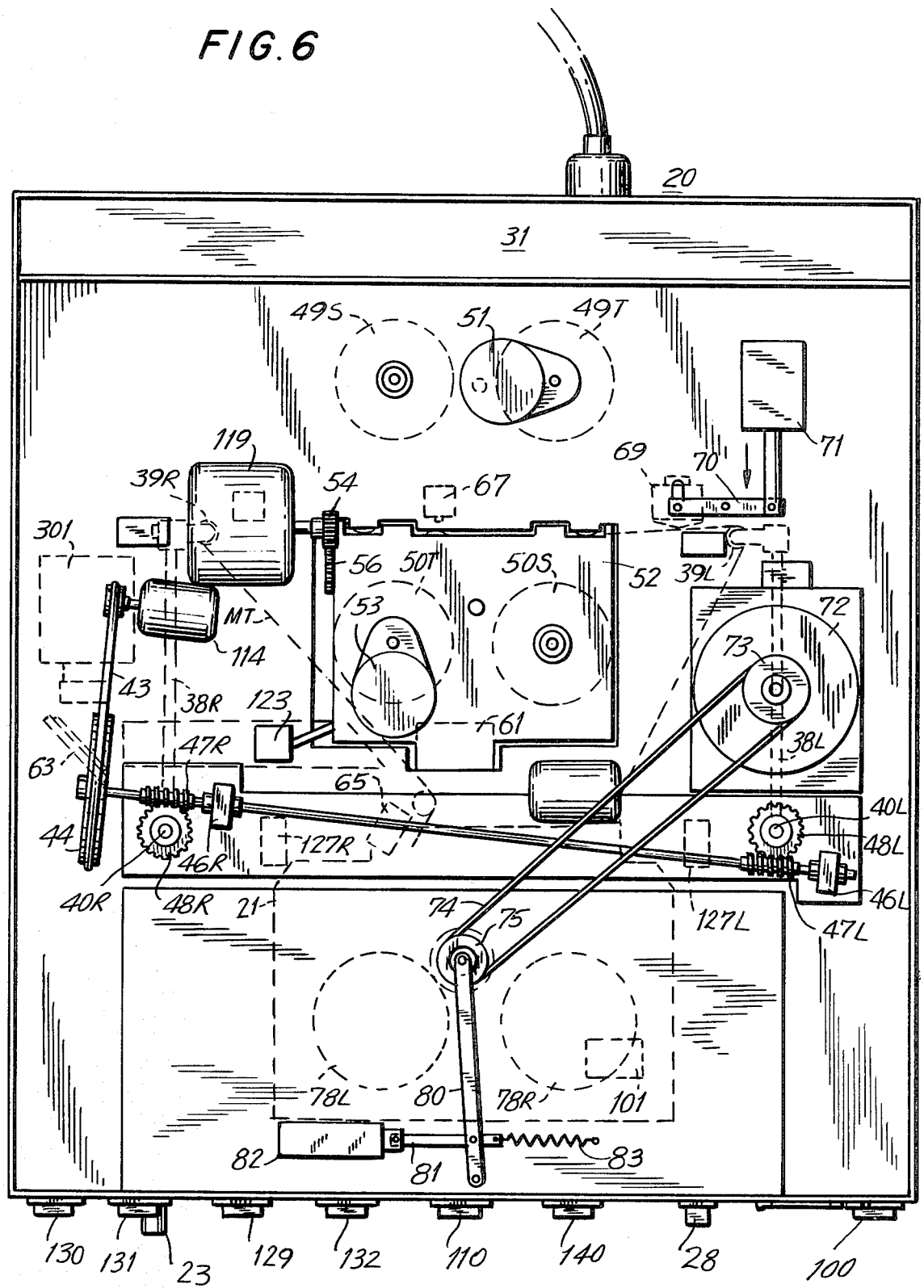
FIG. 6 is a bottom plan view of the device with the cover removed.

By viewing FIGS. 3, 6 and 7 the operation of the movement of the arms 38 can be understood. When the arms 38 are to be moved, loop motor 114 (FIG. 6) is rotated in the appropriate direction. The pulleyed shaft of motor 114 is connected via belt 43 to the pulley 44 of shaft 45 which is supported by bearings 46L and 46R. Fixed on shaft 45 are worms 47L and 47R which engage spur gears 48L and 48R connected to shafts 40L and 40R, respectively.

Two tape wiping stations 49 and 50 are disposed on chassis 32. The wiping station 49 is fixed and wipes the active surface of the magnetic tape MT of the videocassette 21. The station comprises a freely rotatable source reel 49S carrying the wiping tape 49W, a takeup reel 49T driven by motor and reduction gear assemblage 51 (FIG. 8), and idler posts 49P1, 40P2 and 49P3. The wiping station 50 is mounted on rotatable subchassis 52 and wipes the backing surface of the magnetic tape. It comprises (see especially FIGS. 5 and 6) a freely rotatable source reel 50S carrying wiping tape 50W, a takeup reel 50T driven by motor and reduction gear assemblage 53, and idler posts 50P1, 50P2, and 50P3.

The movable wiping station 50 is controllably moved from a retracted position shown in FIGS. 2, 3 and 4 to an operating position shown in FIGS. 5, 6 and 7 by means of motor 119 whose shaft carries spur gear 54. The spur gear 54 engages segment gear 56 shows its position in the operating position. Plunger 58 of microswitch 125 is activated when the station is retraced while plunger 59 of microswitch 125 is activated when the station is in the operative or up position.

Especially in FIG. 5 there is shown three photoelectric systems. The slit evaluator system 60, hereinafter more fully described, comprises a slit lamp 61 on subchassis 52, and a light channel 62, a mirror 63 and a photomultiplier 301 on chassis 32. In addition, there is positioned on chassis 32 a leader sensor system LS including lamp 64 and photocell array 65 which is mounted adjacent the roller 66. The third system is of the reflective type and contained in unit 67.

The chassis 32 also carries a tape polisher 68 in the form of a knife edge. There is a controllably positionable erase head 69 normally maintained in the retracted position but drivable to an operative position by means of lever 70 connected to the plunger of solenoid 71.

The bottom side of chassis 32 as seen in FIGS. 3, 6 and 7 carries the cassette drive motor 72 whose shaft is connected to pulley 73. A belt 74 on pulley 73 transmits power to pulley 75 connected to shaft 76. Shaft 76 is connected to drive wheel 77 (see FIG. 3) which controllably presses against one of the drive hubs 78L or 78R for rotating the reels in the videocassette 21 in the usual manner. By way of example, when the videocassette is of the type proposed in SMPTE Specifications VTR 16.14/6-43 entitled *Dimensions of Small Type Videocassette Intended for ¾ Inch Type-A Format Video Magnetic Tape for Cassette Systems* of October 23, 1975, the hubs 78 can be similar to the reel spindles shown in FIG. 4. The drive wheel 77 is selectively positioned against either of the hubs in accordance with the desired direction of magnetic tape travel by means of lever arm 79 which pivots about pin 80. The lever arm is connected via rod 81 to the armature of solenoid 82. The other end of rod 81 is connected to biasing spring 83. Thus, when the solenoid is not energized spring 83 urges drive wheel 77 against drive hub 78R so that magnetic tape can move forward. When solenoid 82 is energized the drive wheel 77 presses against hub 78L and the tape travels in reverse. In addition a solenoid operated braking means is provided to prevent movement of the tape when not desired. As best seen in FIG. 10, disposed against each portion of the hubs 78L and 78R is a brake band 90 whose ends are fixed to screws 91 and 92. The midpoint of the brake band 90 rides on pulley 93 which is connected to spring 94 and solenoid 84. With the solenoid 84 deenergized, spring 94 pulls the band 90 sufficiently against the hubs 78 to prevent there movement even if driven by the drive wheel 77.

Upon energization of the solenoid 84, the brake band is released sufficiently to permit movement but not completely. Thus the brake band provides drag to prevent free wheeling of the reels and possible tape spill. Finally, disposed about the drive hub 78L is a series of alternately reflective and non-reflective bars 85 which are monitored by photocell array 86 to give an indication of magnetic tape movement to be described more fully below.

Figure 11:
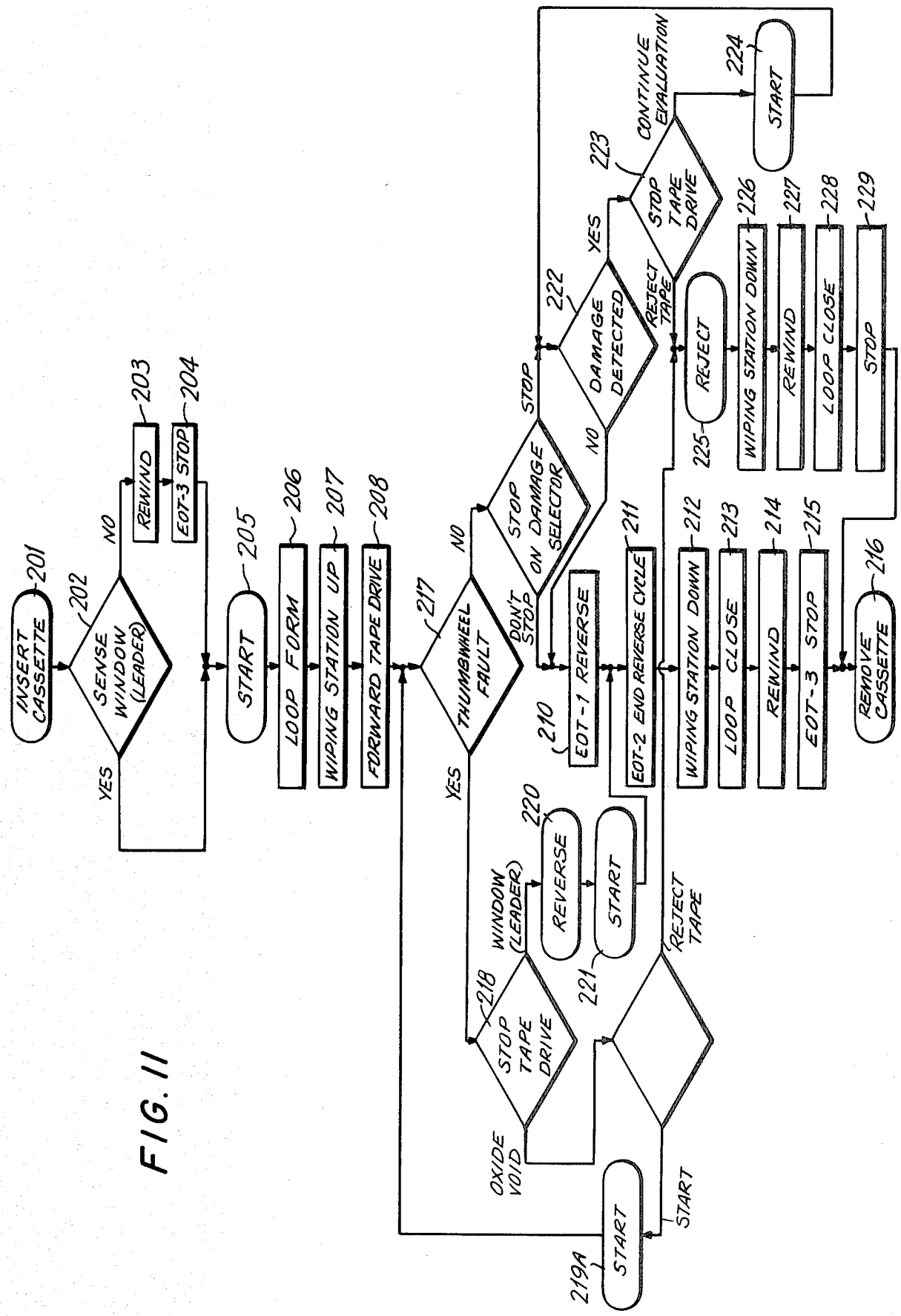
FIG. 11 is a flow chart useful in describing the operation of the device.

The operation of the device will now be described with the aid of the flow chart of FIG. 11 and block diagram of FIG. 12 as well as FIGS. 1 to 8.

In step 201 the videocassette 21 is inserted into the slot of the device to rest on platform 22. Then lever arm 23 is raised to lower platform 22 and to rest the reels and the videocassette 21 onto the hubs 78. See FIG. 3.

In addition, the cover 21G of the video-cassette 21 opens in the usual manner by spring means not shown. Furthermore, when the videocassette 21 reached the down position, tape switch 101 (FIG. 6) is activated alerting AND-circuit 102. The presence of a tape leader is sensed in step 202. Note that the leader sensor system LS of lamp 64 and photocell array 65 straddle the magnetic tape MT in the mouth of the videocassette 21. If a leader is present at this time the system LS (FIG. 12) will not emit a signal on line WP and the operation goes to step 205 of the flow chart. If however, no window is sensed this means that the magnetic tape was not reeled to the beginning before the videocassette was inserted for processing. In this case there will be a signal on line WP which is fed via OR-circuit 106 to the reverse input of forward/reverse flip-flop 104 which via solenoid driver 82D controls solenoid 82 (see also FIG. 6) to position drive wheel 77 (FIG. 3) against the hub 78 which will rewind the magnetic tape. At the same time the signal from AND-circuit 102 is fed via OR-circuit 108 to the on-input of tape drive flip-flop 105 which, via relay 105R, energizes tape drive motor 72 (see also FIG. 6). Thus, step 203 of the flow chart is performed. Sometime during step 203, the beginning leader is sensed by leader sensor system LS which emits a signal on line EOT-3 (Step 204). This signal is passed by OR-circuit 109 to the off-input of tapedrive flop-flop 105 which, via relay 72R deenergizes motor tape drive 72. Thus the tape drive stops with the magnetic tape rewound to the beginning leader. The unit then remains in this idle state until manually commanded to proceed with its operation by the depression of start push button switch 110 (FIG. 1) (Step 205).

The signal from switch 110 turns loop-form flip-flop 111 on, which, via switch 112, energizes loop arm motor 114 in the forward direction i.e., in the direction from the videocassette 21 toward the wiping stations. In particular (FIG. 6) motor 114 rotates shaft 45 whose worms 47 rotate shafts 40 via spur gears 48. Thus the arms 38 move from the position shown in FIG. 2 to just beyond that shown in FIG. 4. When the arms 38 do extend to that point they move plungers 42 of loop form switches 115. (See also FIGS. 8 and 9). Note also that loop-form flip-flop 111 passed a signal via OR-circuit 184 to energize the brake solenoid 84 to permit tape movement. When both switches close a signal is fed to the off-input of loop form flip-flop 111 which in response thereto deenergizes motor 114. Although two switches are used in parallel, economic reasons could dictate the use of only one switch panel.

At the same time, the signal from switches 115 is fed to the on-input of wiping station up flip-flop 116 which, via solid state relay or switch 117, energizes motor 119 to drive, via spur gear 54, the segment gear 56 connected to subchassis 52. (See FIGS. 3 and 6.) As viewed in FIG. 3 subchassis 52 carrying the movable wiping station 50 rotates clockwise about shaft 57 until it is parallel with chassis 32. At that time the subchassis 52 engages the plunger 59 of wiping station up switch 125. Switch 125 on FIG. 12 emits a signal to the off-input of wiping station up flip-flop 116 and motor 119 is deenergized. Thus ending step 207 of the flow chart.

Before proceeding further it will be fruitful to study the state of the processor as shown in FIG. 5. It is seen that the arms 38 have extracted magnetic tape MT from the videocassette 21 and formed an almost triangular loop having apices at the mouth of the cassette, and at fingers 39L and 39R. Note the section of magnetic tape MT defining the side of the triangle between the fingers 39L and 39R moves between the two wiping stations 49 and 50. Because of the offsetting of the idler posts 49 and 50, both surfaces of the magnetic tape MT will move over surfaces of the wiping tapes 49W and 50W as well as the active surface of the magnetic tape being able to move over the knife edge of the polisher 68. Similarly, the magnetic tape MT can move past reflective photocell unit 67 as well as across the path of the light beam from source 61 to the photomultiplier 301.

In step 208 the magnetic tape is driven forward. In particular, when switch 123 closed it also emitted a signal via OR-circuit 108 to the on-input of tape drive flip-flop 105 to cause the energizing of tape drive motor 72. (Note whenever motor 72 is energized the wiping motors 51 and 53 for moving wiping tape are also energized.) At the same time flip-flop 105 passes a signal via OR-circuit 184 to energize brake solenoid 84 to permit movement of magnetic tape MT.

In addition, this signal is fed via OR-circuit 107 to the forward-input of flip-flop 104 to control the solenoid 82 to position drive wheel 77, as described above, against the hub for driving the magnetic tape in the forward direction.

Magnetic tape MT now runs from the supply reel to the takeup reel in the videocassette 21. For the time being it will be assumed that there is no thumbwheel fault and that there will either be no stopping on damage or no tape damage detected. In either case the magnetic tape MT now runs to the end when leader sensor system LS detects the end leader (trailer) and emits a signal on line EOT-1. Step 210.

The signal on line EOT-1 is fed, via OR-circuit 106 to the reverse-input of flip-flop 104 which changes the state of the solenoid 82 causing the drive wheel 77 to move against the supply hub and the magnetic tape is now driven in the reverse direction. During the reverse pass, wiping and polishing are repeated.

Step 211 starts when all the magnetic tape is back on the supply reel as indicated by leader sensor system LS emitting a signal on line EOT-2 when the beginning leader is sensed. The signal on line EOT-2 is fed via OR-circuit 107 to the forward-input of flip-flop 104 to set it for driving in the forward direction. However, the tape drive motor 72 is turned off when the signal on line EOT-2 is fed via OR-circuit 109 to the off-input of tape drive flip-flop 105. Thus, tape movement stops with the possibility that subsequent movement will be in the forward direction.

Lastly, in step 212, the signal on line EOT-2 passes through OR-circuit 141 to the on-input of the wiping station-down flip-flop 124. The output of this flip-flop, via solid state relay or switch 118, energizes motor 119 in the reverse direction while at the same time, this signal, through solid state relay or switch 121, releases electrical brake 122.

Now the motor 119 (see FIG. 3) rotates in the opposite direction causing the subchassis 52 to pivot counterclockwise until it engages plunger 58 of wiping station down switch 125.

Switch 125 emits a signal which is fed to the off-input of flip-flop 124 for stopping the rotation of the motor 119. In addition, that signal is also fed to the on-input of loop close flip-flop 126 which via switch 113 energizes motor 114 in the reverse direction causing arms 38 (FIG. 5) to move toward the closed position as shown in FIG. 2 (Step 213). However, at the same time that signal also is fed via OR-circuit 108 to the on-input of tape drive flip-flop 105 which via relay 72R energizes the motor 72 so that, as the loop collapses, the excess tape is wound into the videocassette.

When the arms 38 are fully retracted they engage the plungers 42CL of loop closed switches 127. Switches 127 emit a signal via OR-circuit 106 to the reverse-input of flip-flop 104 so that tape is now driven by still rotating motor 72 in the reverse direction. (Step 214.) Again for economic reasons it may be desirable to use only one switch.

When the beginning of tape leader is detected by leader sensor system LS, it emits a signal on line EOT-3. This signal is fed via OR-circuit 109 to the off-input of flip-flop 105 which turns off motor 72 and releases brake solenoid 84 thus applying brakes.

Finally, in step 216 the load lever 23 is lowered (FIG. 1) and the videocassette 21 removed by the operator.

The fault routines associated with the operations will not be described. The first is a thumbwheel fault. Missing magnetic oxide coating on the tape can be falsely recognized as a transparent leader. If the device would recognize it as such, false further processing would occur. Accordingly, the estimated length of the magnetic tape is manually set into the thumbwheel 27 (FIG. 1).

Figure 12:
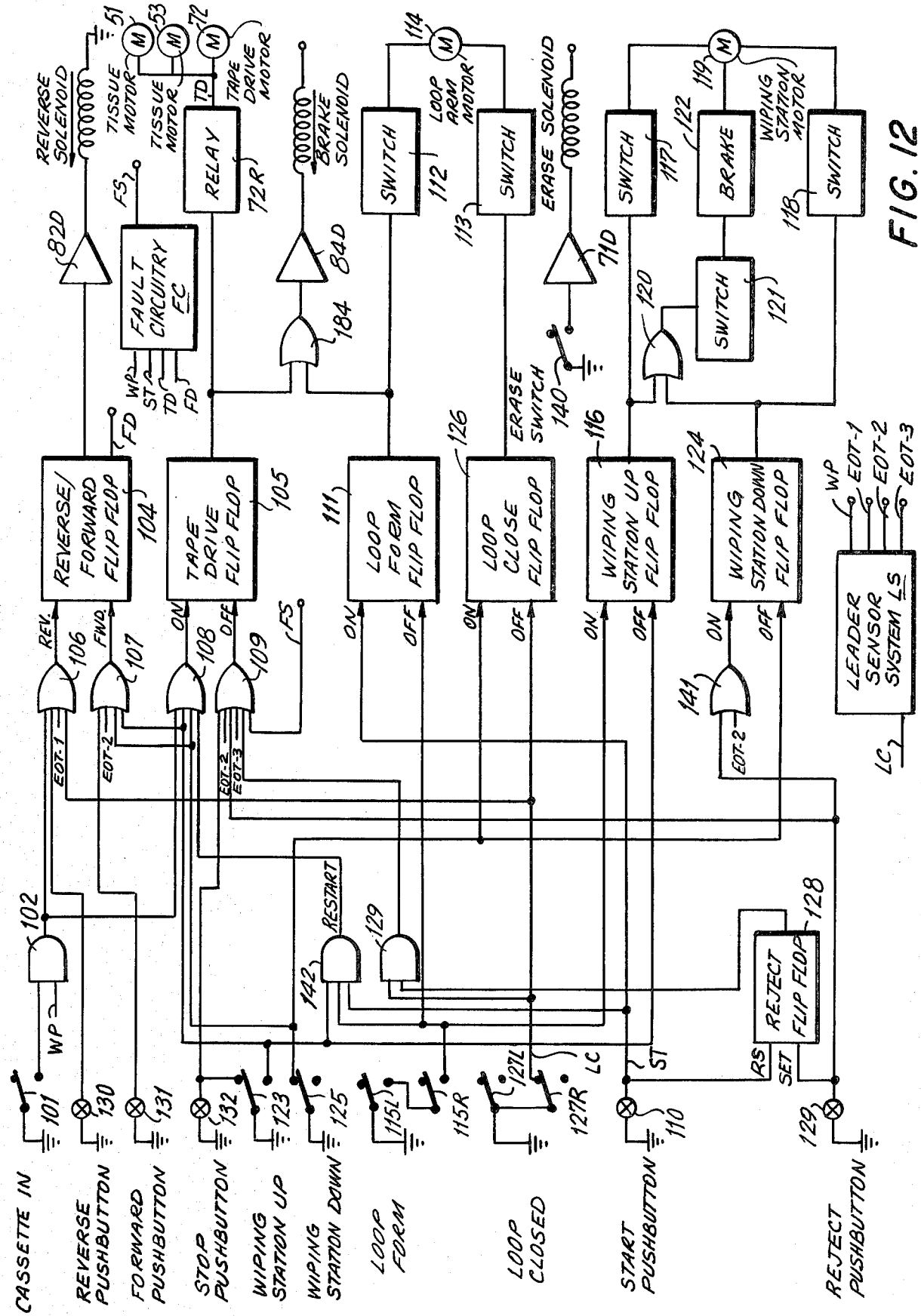
FIG. 12 is a block diagram of other control circuitry of the device.

If now a window (clear areas of tape) is sensed by fault circuitry FC before the set length is reached the circuitry emits a signal on line FS FIG. 12. (Step 217). This signal is fed via OR-circuit 109 to the off-input of tape drive flip-flop 105 to stop the movement of the magnetic tape and the fault light is lit on the front panel. (FIG. 1.)

In step 218 of the flow chart, the operator then opens lid 20L of the processor 20 and visually looks at the tape in the loop. If the window is an oxide void he can continue the processing by pushing the start button 110 of FIG. 12. The signal on line ST from the switch 110 is fed to the fault circuitry where it terminates the signal on line FS. In addition, it passes via AND-circuit 142 and OR-circuit 108 to the on-input of tape drive flip-flop 105 which again energizes the motor 72. (The reject mode will be described hereinafter.)

If on the other hand the operator sees that the end of the tape leader was sensed, he pushes reverse switch 130. (Step 220.) The signal so generated passes via OR-circuit 106 to the reverse-input of flip-flop 104 to set the tape drive for reverse driving in the usual manner. Finally in step 221 the operator pushes start switch 110 and the start routine as described for step 219 is performed.

The next types of faults is associated with tape damage such as changes in tape width, scratches, blemishes or the like. If the tape is to stop on a damage the switch 28 on the front of the processor (FIG. 1) is set to "ALL" and the flow chart is at step 209 and proceeds to step 222 activating the fault circuitry FC of FIG. 11. If no damage is detected during the forward pass of the magnetic tape the flow is to step 210 et. seq. If a damage is detected a signal is emitted by the fault circuitry FC onto line FS.

This signal stops the tape drive and gives alarms in the same manner as in step 218.

The operator can look at the tape as before and decide to continue evaluation or reject the tape. If the evaluation is to continue he depresses start switch 110 and the drive is restarted as in step 219.

If on the other hand he decides to reject the tape he presses reject switch 129 which sets the reject flip-flop 128. This flip-flop emits a signal which passes via AND-circuit 129 and OR-circuit 109 to the off-input of tape drive flip-flop 105. If the motor had already been deenergized in step 223 nothing further happens. However, the signal also passes via OR-circuit 141 to the on-input of wiping station down flip-flop 124. And the wiping station 50 is retracted the same as in step 212. (Step 226.) When the station is down the switch 125 emits a signal which restarts the tape drive to rewind in the manner of step 214. (Step 227.) The signal from switch 125 in the usual manner as in step 213, closes the arms 38. (Step 228.) When the arms close switches 127 pass a signal via AND-circuit 129 and OR-circuit 109 to the off-input of tape drive flip-flop 105 stopping the tape drive. (Step 229.) Then the videocassette 21 is removed as in step 216.

The leader sensor system LS of FIG. 12 will now be described with the aid of FIGS. 13 to 16.

In FIG. 13 the magnetic tape MT is shown interposed between the lamp 64 and the photodiodes 65 just at the transition from opaque magnetic oxide coated tape MTO to transparent end leader MTL, it being assumed the tape is moving in the direction of the arrow FWD i.e., from supply to takeup reel. Note from FIG. 14, that there are two photodiodes 65-1A and 65-1B in parallel to handle the case where some tapes employ coded end leaders. Thus the photodiodes 65-1A and B look at the upper and lower halves of the magnetic tape. Hence either one of these photodiodes will detect the transparent portion of the trailer and ignore the opaque coding.

The operation of the system will be described assuming several parameters. For example, the tape moves at 60 inches per second and the separation D of the photodiodes is 0.5 inches. Thus the time for the transision to affect diodes 65-2 and 65-1 is 8.33 msec.

Now in FIG. 15 the photodiodes 65-1A and 1B are shown connected in parallel via resistor R1 between voltage source V and ground. Thus, with no light these diodes are non-conducting and the junction of the diodes has a potential V. This junction is connected to the first input of difference amplifier K1 whose second input is maintained at a potential V/n. The polarities of the inputs are chosen such that when the potential of the first input is greater than that of the second input the output of the amplifier K1 is high. When the relation between the potentials of the inputs is reversed the output goes low. Thus when light falls on either of the photodiodes 65-1 it conducts and grounds the first input to the amplifier K1 whose output goes down.

The output of amplifier K1 is fed in parallel to two differentiators D1-1 and D1-2. The time constant of differentiator D1-2 is chosen to be about ten times that of D1-1. Hence, in response to the transition from opaque to transparent indicated by line LT1 of FIG. 16 forward tape movement differentiators D1-1 and D1-2 emits the pulses on lines AF and BF. Eight and a third milliseconds later at line LT2 light now strikes photodiode 65-2. This photodiode is connected in a similar manner to that of photodiodes 65-1 to difference amplifier K2 operating the same as amplifier K1. The output of amplifier K2 is connected to the input of differentiator D2-1 which is similar differentiator D1-1 and to the input of differentiator D2-1 which is similar to differentiator D2-1. Differentiator D2-1 emits the signal on line CF: and differentiator D2-2 the signal on line DF.

The outputs of differentiators D1-2 and D2-1 are connected to respective inputs of AND-circuit A1 which will emit a signal on line EOT-1 only during the coincidence of signals on lines CF and BF of FIG. 16. This coincidence can only occur when the tape is moving in the forward direction as indicated by the arrow FWD of FIG. 12.

A similar analysis holds when the tape is moving in the reverse direction and the start leader is sensed. At that time the photodiode 65-2 is first activated as indicated by the transition at line LT3 of FIG. 15 and the signals on lines CR and DR are generated by differentiators D2-1 and D2-2 respectively. At the transition indicated by line LT4 at least one of the photodiodes 65-1 is energized and the signals or lines AR and BR are generated by differentiators D1-1 and D1-2 respectively.

The outputs of differentiators D1-1 and D2-2 are connected to inputs of AND-circuit A2. Thus, a signal is passed onto line EOT-2 for a coincidence of the signals on lines AR and DR of FIG. 15.

In addition, the output of the differentiator D1-2 is connected to one input of AND-circuit A3 whose other input is connected to line LC to generate the signal on line EOT-3. Finally, the output of differentiator D2-2 is coupled via amplifier AW to line WP.

Figure 17:
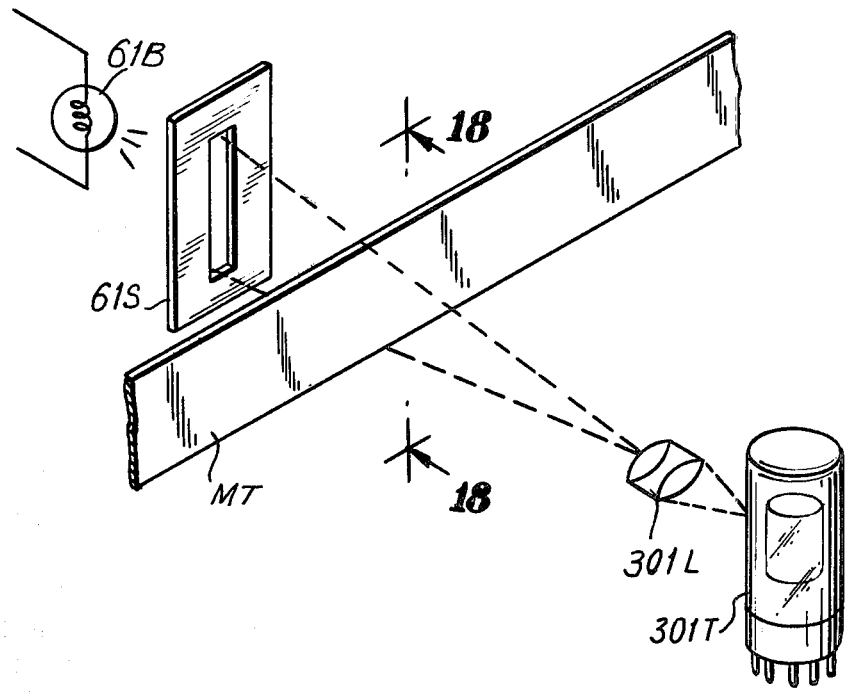
FIG. 17 is a diagrammatic view of a light transmissive fault detection system.
Figure 18:
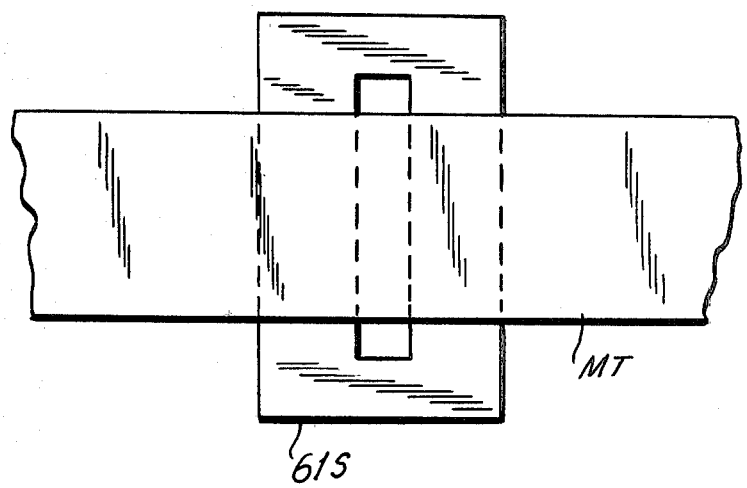
FIG. 18 is a view taken in the direction of arrow 18 of FIG. 17.

The system also evaluates for physical damage to the regions having a width which is different from a nominal standard width, pinholes, scratches, blemishes and the like. Two photoelectric systems are used. The slit evaluation system 60 is employed to test for changes in width, pinholes and scratches. It comprises slit lamp 61 composed of lamp 61B behind a slit 61S oriented perpendicular to the magnetic tape MT and photomultiplier 301 having a lens 301L and a photomultiplier tube 301T. See FIGS. 17 and 18. By using a slit 61S which is orthogonal to the magnetic tape MT and which has a length greater than the width of the tape, vertical tape jitter (jitter along the transverse axis of the tape) does not produce a fault or damage signal. It should be apparent from FIG. 17 that as long as the transverse displacement is within reasonable limits the photomultiplier 301 "sees" the same amount of light. It has been found, for the example, that with three-quarter inch magnetic tape a slit height of one inch and a width of 0.125 inches provides reliable results. Such a photoelectric system can not only detect pinholes but also deviations of as little as 0.02 inches in nominal width. Such defects cause the photomultiplier 301 to emit signals different from a normal level.

The second photoelectric system 67 basically monitors the surface of the magnetic tape MT by means of reflective phenomena. See FIG. 19. In particular a lamp 67B projects light onto the oxide surface of the tape which reflects it to photocell 67P. Changes in reflectance cause the photocell 67P to emit signals different from a normal level.

The signals from photomultiplier 301 are fed to amplifier 302 and the signals from photocell 67P are fed to amplifier 304. By setting the gains of these amplifiers one can choose the sensitivity of the detectors. The outputs of the amplifiers 302 and 304 are combined in conventional mixer 305 and fed via low pass filter 306 (for high frequency noise removal) to paraphrase amplifier 307. This amplifier emits the combined damage signal from its direct output (+) and an inverted version of that signal from its inverse output (−).

It should be apparent that both phases of the signal are required since photomultiplier 301 will emit say a positive going signal for narrow regions of tape and a negative going signal for wide regions of tape. Similarly, the polarity of the signal from photocell 67P is controlled by increases and decreases of tape reflectance from a normal level.

The outputs of the paraphrase amplifier are fed to respective first inputs of voltage comparators 308A and 308B whose second inputs are connected to a fixed reference voltage established by potentiometer 36. This reference voltage is chosen to be a low value such that low level pulses will pass via the outputs of the comparators to line MN. Such pulses indicate minor damages. Similarly, comparators 309A and 309B are connected to the outputs of the paraphrase amplifier 307 and to potentiometer 35 which is set to a higher level. Thus, only greater amplitude pulses which constitute major damages pass onto line MJ. Either type of damage pulse is fed via OR-circuit 310 to the incrementing input T of damage counter 325. The counter 325 can be a conventional pulse counter which drives a digital display. The clear circuitry 325C connected to the CL-input clears the count in the counter 25 when desired. Clearing can occur automatically at the end of a pass or the like.

In addition, the signals on lines MN and MJ are fed to respective inputs of AND-circuits 330 and 332.

The other input of AND-circuit 330 is connected to the MAJOR position of stop control switch 28. If the switch is in this position a pulse on line 330 will pass through the AND-circuit 330 to OR-circuit 313. If the switch 28 were connected as shown to the MINOR position, the AND-circuit 332 would pass any pulses on line MN to OR-circuit 313. If the switch is on the OFF position no pulses can be fed to OR-circuit 333. The output of OR-circuit 313 is connected to the set input of fault flip-flop 33 whose output is connected to line FS. Thus, the processor can be controlled to stop on a major damage or a minor damage, or else ignore any damage.

The thumbwheel fault circuitry includes the thumbwheels 27 and a decoder 27D which are basically rotary switches. The contacts of the thumbwheel switches are fed to inputs of a conventional decoder 27D whose outputs are connected to the inputs of one side of a magnitude comparator 350. The opaque tachometer wheel 37 which is rotated by the moving magnetic tape MT (FIG. 4) has a transparent slit 37S and is interposed between the lamp 37L and the photocell 37P. Thus, once per revolution, the tachometer system emits a pulse to the input of pulse counter 351.

Each pulse fed to counter 351 represents a given length of tape which can be calibrated to equal a time increment for tape moving at a known velocity. The outputs of the counter are fed to inputs at the other side of comparator 350. The output of the comparator 350 is connected to the set input of flip-flop 352 whose O-output is connected to an input of AND-circuit 353. The other inputs of the AND-circuit are connected to lines WP and FD. The output of the flip-flop is connected to an input of OR-circuit 313. Initially, with a length set in the thumbwheel 27 the start signal on line ST clears the counter 351 and the flip-flop 352. As the wheel 37 turns in response to tape movement a count is accumulated in counter 351. As long as this count represents a distance less than that set in the thumbwheels, the output of the comparator is low and the flip-flop is cleared with its O-output high.

What is claimed is:

1. Apparatus for processing a magnetic tape having a layer of magnetizable material on one surface and stored on two reels in a cassette, said cassette having an access opening for exposing a portion of the tape, said apparatus comprising: a tape wiping means, said tape wiping means including a first pair of spaced reels, a first wiping tape mounted on said first pair of reels, first positioning means for positioning a portion of said first tape against one surface of the magnetic tape, first driving means for rotating one of the reels of said first pair whereby new portions of said first wiping tape wipe said one surface of the magnetic tape, a second pair of spaced reels, second wiping tape mounted on said second pair of spaced reels, second positioning means for positioning a portion of said wiping tape against the other surface of the magnetic tape, and second driving means for rotating one of the reels of said second pair whereby new portions of said second wiping tape wipe said other surface of the magnetic tape; finger means extending into the opening of the cassette for withdrawing the tape therefrom to constrain the tape to a path opposite said tape wiping means, said finger means moving from a first position to engage the magnetic tape in the opening of the cassette to a second position which establishes the path of travel of the magnetic tape; means for maintaining said first pair of spaced reels in a retracted position while said finger means moves between said first and second positions and for moving said first pair of reels to a tape wiping position after said finger means arrives at said second position; and means for driving said reels whereby the magnetic tape moves past said tape wiping means.

2. The apparatus of claim 1 further comprising a knife edge means positioned opposite a point along the tape path and extending transversely to said tape for polishing the surface of the magnetic tape having the layer of magnetizable material.

3. The apparatus of claim 1 further comprising a magnetic erasing head controllably positionable against the surface of the magnetic tape having the layer of magnetizable material.

4. The apparatus of claim 1 wherein said driving means comprises a pair of hub means for engaging each of said reels, a motor, a swingable drive wheel rotated by said motor and means for positioning said drive wheel alternately against said hub means in accordance with the direction of desired movement of the magnetic tape.

5. The apparatus of claim 4 further comprising a brake means controllably positionable against at least one of said hub means.

6. The apparatus of claim 4 further comprising means for applying drag to at least one of said hub means.

7. The apparatus of claim 4 further comprising indicia on one of said hub means and means for sensing for said indicia to indicate that said hub means is rotating, and stopping means functioning when said drive means is operating to stop said drive means if said sensing means does not indicate that said hub means is rotating.

8. The apparatus of claim 7 wherein said indicia are alternate regions of reflective and nonreflective material on said hub means and said sensing means includes means for projecting light on said material and photosensor positioned to receive light reflected from said regions.

9. The apparatus of claim 1 further comprising control means for controlling the operation of said drive means in accordance with optical properties of regions of the magnetic tape.

10. The apparatus of claim 9 wherein the magnetic tape has a transparent leader at one end thereof and said control means comprises sensing means operative while the magnetic tape is moving for sensing for the transparent leader, and means responsive to said sensing means for causing said driving means to drive the magnetic tape in the opposite direction upon the sensing of the transparent leader.

11. The apparatus of claim 10 wherein the magnetic tape has given length, means for storing a first indicia related to the given length and means for generating second indicia associated with the instantaneous distance of travel of the magnetic tape, said control means including means response to said generating means and said storing means for stopping said driving means if a particular indication of an optical property of the magnetic tape is given only while said second indicia is less than said first indicia.

12. The apparatus of claim 11 wherein said particular indication of an optical property is a region of light transmissivity which is greater than a given amount.

13. The apparatus of claim 9 wherein said control means comprises electrooptical means for examining the magnetic tape.

14. The apparatus of claim 13 wherein said electrooptical means comprises means for measuring the light reflectance of regions of the magnetic tape.

15. The apparatus of claim 13 wherein said electrooptical means comprises means for measuring the light transmissivity of regions of the magnetic tape.

16. The apparatus of claim 15 wherein said electrooptical means further comprises means for measuring the light reflectance of said regions of the magnetic tape.

17. The apparatus of claim 16 further comprising means for controlling the sensitivity of said electrooptical means for selecting by means of signal amplitude when said drive means will stop.

18. Apparatus for processing a magnetic tape having a layer of magnetizable material on one surface and stored on two reels in a cassette, said cassette having an access opening for exposing a portion of the tape, said apparatus comprising a tape wiping means, finger means extending into the opening of the cassette for withdrawing the tape therefrom to constrain the tape to a path opposite said tape wiping means, said finger means moving from a first position to engage the magnetic tape in the opening of the cassette to a second position which establishes the path of travel of the magnetic tape before said reels are driven and from the second position to the first position in response to a processing-terminated signal; means for driving said reels whereby the magnetic tape moves past said tape wiping means; means for generating a processing-terminated signal for stopping said drive means; and means operative after the generation of the processing terminated signal for further energizing said driving means to reel into the cassette the remaining withdrawn tape.

19. The apparatus of claim 18 wherein said driving means are further energized simultaneous with the movement of said finger means from said second position to said first position.

* * * * *